US012020292B2

(12) United States Patent
Zavesky et al.

(10) Patent No.: US 12,020,292 B2
(45) **Date of Patent: *Jun. 25, 2024**

(54) SYSTEM FOR DELIVERY OF XR AD PROGRAMS

(71) Applicant: AT&T Intellectual Property I, L.P., Atlanta, GA (US)

(72) Inventors: Eric Zavesky, Austin, TX (US); Paul Triantafyllou, Summit, NJ (US); Tan Xu, Bridgewater, NJ (US); Zhu Liu, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,977

(22) Filed: Oct. 10, 2022

(65) Prior Publication Data

US 2023/0030362 A1 Feb. 2, 2023

Related U.S. Application Data

(63) Continuation of application No. 17/154,380, filed on Jan. 21, 2021, now Pat. No. 11,501,341, which is a (Continued)

(51) Int. Cl.

*G06Q 30/02* (2023.01)
*G06Q 30/0241* (2023.01)
*G06T 11/60* (2006.01)

(52) U.S. Cl.

CPC .......... *G06Q 30/0276* (2013.01); *G06T 11/60* (2013.01); *G06T 2200/24* (2013.01)

(58) Field of Classification Search

CPC ............... G06Q 30/02; G06Q 30/0276; G06Q 30/0254; G06Q 10/067; G06Q 30/0246; (Continued)

(56) References Cited

U.S. PATENT DOCUMENTS 9,111,285 B2 8/2015 Amidon et al.
9,721,394 B2 8/2017 Rosenthal et al.
(Continued)

FOREIGN PATENT DOCUMENTS

CA 2659698 A1 * 9/2009 ............. G06Q 30/00
CN 109074679 A * 12/2018 ............ G06T 19/00
(Continued)

OTHER PUBLICATIONS

M. Lengheimer; G. Binder; T. Rosler, Content management systems for mobile, context-dependent augmented reality applications (English), 2014 37th International Convention on Information and Communication Technology, Electronic and Microelectronics (MIPRO) (pp. 1521-1526), Aug. 15, 2014 (Year: 2014).*
(Continued)

*Primary Examiner* — Marilyn G Macasiano
(74) *Attorney, Agent, or Firm* — Guntin & Gust, PLC; Dana B. LeMoine

(57) ABSTRACT

Aspects of the subject disclosure may include, for example, a method including obtaining an advertisement package, wherein the advertisement package defines an interactive extended reality advertisement and includes a plurality of optional features; obtaining information about a user, their equipment, and their environment; creating an interactive extended reality advertisement by choosing a selected feature of the plurality of optional features according to the user information; and presenting the interactive extended reality advertisement to the user equipment. Other embodiments are disclosed.

20 Claims, 8 Drawing Sheets

CLOUD COMPUTING ENVIRONMENTS 375
VIRTUALIZED NETWORK FUNCTION CLOUD 325
VNE 330
VNE 332
VNE 334
300
TRANSPORT LAYER 350
BROADBAND ACCESS 110
CONTENT SOURCES 175
VOICE ACCESS 130
WIRELESS ACCESS 120
MEDIA ACCESS 140

Related U.S. Application Data continuation of application No. 16/100,503, filed on Aug. 10, 2018, now Pat. No. 10,929,894.

(58) Field of Classification Search
CPC . G06Q 30/0207; G06T 11/60; G06T 2200/24; G06T 11/00
See application file for complete search history.

(56) References Cited

U.S. PATENT DOCUMENTS

| | | | | |
|---|---|---|---|---|
| 9,857,170 | B2 * | 1/2018 | Abovitz | H04B 10/25891 |
| 9,870,571 | B1 | 1/2018 | Lamontagne et al. | |
| 10,008,037 | B1 | 6/2018 | Worley, III et al. | |
| 10,326,978 | B2 * | 6/2019 | Ostrover | H04S 7/301 |
| 10,803,674 | B2 * | 10/2020 | Kocharlakota | G06T 19/006 |
| 2009/0089294 | A1 * | 4/2009 | Davis | H04N 21/475 |
| 2012/0113141 | A1 | 5/2012 | Zimmerman et al. | |
| 2012/0150650 | A1 | 6/2012 | Zahand | |
| 2012/0259712 | A1 | 10/2012 | Hyndman et al. | |
| 2013/0297407 | A1 * | 11/2013 | Hymel | G06Q 30/0267 705/14.58 |
| 2014/0025481 | A1 | 1/2014 | Kang et al. | |
| 2014/0089970 | A1 | 3/2014 | Amidon et al. | |
| 2015/0262208 | A1 | 9/2015 | Bjontegard | |
| 2016/0210602 | A1 * | 7/2016 | Siddique | G06Q 30/0601 |
| 2017/0039771 | A1 * | 2/2017 | Chowdhary | G06T 19/006 |
| 2017/0287007 | A1 * | 10/2017 | Du | G06Q 30/0271 |
| 2018/0190033 | A1 | 7/2018 | Barnett et al. | |
| 2018/0192149 | A1 | 7/2018 | Anguiano | |
| 2020/0051132 | A1 | 2/2020 | Zavesky et al. | |
| 2021/0142369 | A1 | 5/2021 | Zavesky et al. | |

FOREIGN PATENT DOCUMENTS

| | | | | |
|---|---|---|---|---|
| WO | WO 2012/092667 A1 * | 7/2012 | H04L 12/16 |
| WO | WO 2017/176819 A1 * | 10/2017 | G06T 19/00 |
| WO | 2018026649 A1 | 2/2018 | |
| WO | WO 2019/023659 A1 * | 1/2019 | |

OTHER PUBLICATIONS

Petros Belimpasakis; Rod Walsh, A combined mix reality and networked home approach toimproving user interaction with consumer electronics (Englaish); IEEE Transactions on Consumer Electronics (vol. 57, Issue: 1, pp. 139-144), Apr. 4, 2011 (Year: 2011).*

Martin L.-Nores; Yolanda B.-Fernandez; Jose J. P.-Arias; Alberto G._Solla; Manuel R.-Cabrer, Augm. reality, smart codes and cloud computing for personalized interactive advertis on billboards (Engl), 2015 10th Internat. Workshop on (SMAP) (pp. 1-6), Jan. 22, 2016 (Year: 2016).*

F. Chehimi; P. Coulton; R. Edwards, Augmented Reality 3D Interactive Advertisements on Smartphones (English), International Conference on the Management of Mobile Business (ICMB 2007) (p. 21), Apr. 21, 2008 (Year: 2008).*

Martin L.-Nores; Yolanda B.-Fernandez; Jose J. P.-Arias; Alberto G._Solla; Manuel R.-Cabrer, Delivering personalized m-commerce through cloud.based augmented reality on billboards (English), 2015 IEEE International Conference on Consumer Electronics (ICCE) (pp. 162-163), Jan. 1, 2015 (Year: 2015).*

J. Stoyanova; P. Quelhas Brito; P. Georgieva; M. Milanova, Comp of cons purchase intention bet interactive and augmented reality shopping platforms through statistical analyses (Engl), 2015 International Symp on Innovation in Intelligent SysTems and Applications (INISTA) (pp. 1-8), Sep. 1, 2015 (Year: 2015).*

Chehimi, F. et al., Augmented Reality 3D Interactive Advertisements on Smartphones (English), International Conference on the Management of Mobile Business (ICMB 2007) (p. 21), Jul. 1, 2007 (Year: 2007).

Lee, Joo-Hyun, Advertising in interactive television: How audiences' interactions nwith ads affect perceptions of programs and brands, Michigan State University, ProQuest Dissertations Publishing, 2003. 3092175., 195 pages (Year: 2003).

Meegahapo, Lakmal et al., "Enhanced in-store shopping experienc ehrough smart phone based mixed reality application", 2017 Seventeenth International Conference on advances in ICT for Emerging Regions (ICTer), Sep. 1, 2017, 2 pages.

Upadhyay, Aayush et al., Mechanism for Displaying Three-Dimensional Objects Alongside Video in Virtual Reality, An IP.com Prior Art Database Technical Disclosure, Dec. 14, 2017 (Year: 2017).

Wolfel, Matthias, Interacting with Ads in Hybrid Urban Space (English), 2014 International Conference on Cyberworlds (pp. 190-197), Oct. 1, 2014 (Year: 2014).

* cited by examiner

300

600

SYSTEM FOR DELIVERY OF XR AD PROGRAMS

CROSS REFERENCE TO RELATED APPLICATIONS

This application is a continuation of U.S. application Ser. No. 17/154,380, filed Jan. 21, 2021, which is a continuation of U.S. application Ser. No. 16/100,503, filed Aug. 10, 2018 (now U.S. Pat. No. 10,929,894), which are incorporated herein by reference in their entirety.

FIELD OF THE DISCLOSURE

The subject disclosure relates to extended reality advertising.

BACKGROUND

Interactive advertisements are increasingly required to engage and entertain users even for simple product marketing. Traditionally, this may involve a static on-screen display with a call to action (CTA) via a barcode, secondary application, etc.

BRIEF DESCRIPTION OF THE DRAWINGS

Reference will now be made to the accompanying drawings, which are not necessarily drawn to scale, and wherein.

DETAILED DESCRIPTION

Figure 1A:
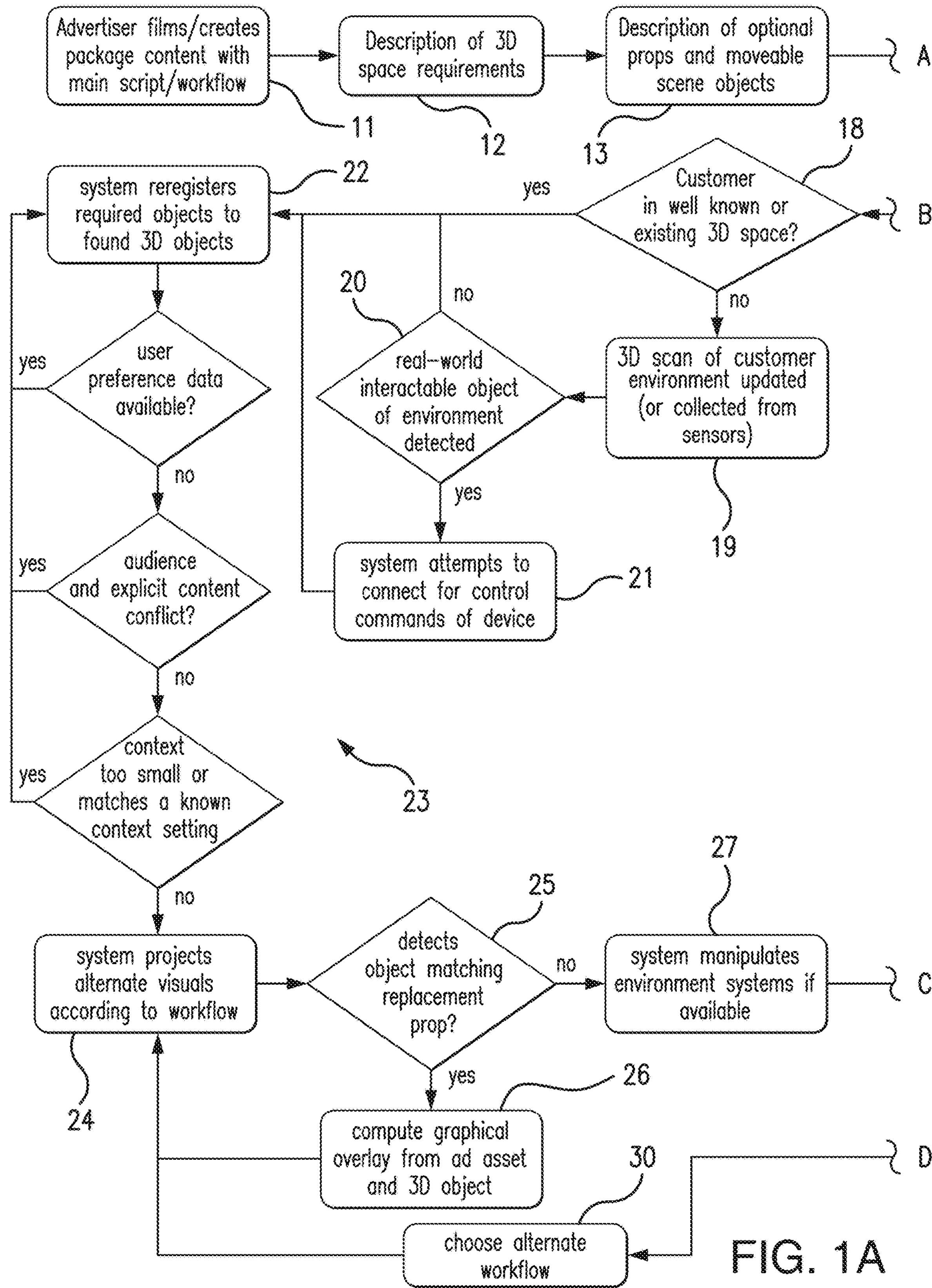
FIG. 1A and FIG. 1B depict an illustrative embodiment of a method in accordance with various aspects described herein.

The subject disclosure describes, among other things, illustrative embodiments for extended reality advertising. Other embodiments are described in the subject disclosure.

One or more aspects of the subject disclosure include a method including obtaining an advertisement package, wherein the advertisement package defines an interactive extended reality advertisement and includes a plurality of optional features; obtaining information about a user, their equipment, and their environment; creating an interactive extended reality advertisement by choosing a selected feature of the plurality of optional features according to the user information; and presenting the interactive extended reality advertisement to the user equipment.

One or more aspects of the subject disclosure include a machine-readable storage medium, comprising executable instructions that, when executed by a processing system including a processor, facilitate performance of operations at a storage device, comprising: obtaining user information about a user, their equipment, and their environment; choosing a product from a plurality of products according to the user information; obtaining an advertisement package for the product, wherein the advertisement package defines an interactive extended reality advertisement for the product and includes a plurality of optional features; creating an interactive extended reality advertisement for the product by choosing a selected feature of the plurality of optional features according to the user information; and presenting the interactive extended reality advertisement for the product through the user equipment.

One or more aspects of the subject disclosure include A device, comprising: a processing system including a processor; and a memory that stores executable instructions that, when executed by the processing system, facilitate performance of operations, the operations comprising: obtaining first information about a first user, a first user equipment, and a first user environment; choosing a product from a plurality of products according to the first information; obtaining an advertisement package for the product, wherein the advertisement package defines an interactive extended reality advertisement for the product and includes a plurality of optional features; creating a first interactive extended reality advertisement for the product by choosing and customizing a first selected feature of the plurality of optional features according to the first information; presenting the first interactive extended reality advertisement for the product to the first user equipment; obtaining second information about a second user, a second user equipment, and a second user environment; creating a second interactive extended reality advertisement for the product by choosing and customizing a second selected feature of the plurality of optional features according to the second information; and presenting the second interactive extended reality advertisement for the product to the second user equipment.

As used herein, the term extended reality (XR) applies to augmented reality (AR) and overlays, virtual reality (VR) simulated environment, and/or mixed reality (MR) with overlays and physical objects or actors. Embodiments disclosed herein advertisement packages for specific products, services, and/or companies. While the advertisement packages are aimed at promoting specific products, for example, they are used to produce customizable ads aimed at each user based on their context, such as their equipment, their environment, etc. For example, the ads may be personalized for a user's environment, such as the available space, location, layout, etc. The ads may be personalized based on user behavior/preferences. The ads may be built from the advertisement packages, as needed, to adapt to the user and their context, such that each user experience is unique. In some embodiments, users may share ads or portions thereof with other users, in which case ads need not be completely unique and may share select features, which may be adapted for other user contexts.

For example, as advertisement for a movie could replace the faces of everyone around the user with the face of an actor in the movie. A similar advertisement could replace the faces of someone around the user with the face of an actor extoling the virtues of a product. In both cases, the faces would track the people around the user, thereby accounting for the user's environment. A third ad could replace the faces of someone around the user with the face of an actor, of whom the user is a fan, extoling the virtues of a product, thereby also accounting for the user themselves. The third ad could replace the faces of someone around the user with the face of a cartoon character, where the user is a child, extoling the virtues of a product, thereby also accounting for the user themselves.

In some embodiments, an optional feature of an advertisement package might include a movie character that interacts with the user's environment. For example, where the user is a Star Wars fan, the character might be a Storm Trooper, who appears to walk around the user's environment (including objects and people therein) and interacts with the user. This interaction could include extoling the virtues of a product, such as a beverage. If the user's environment includes a beverage can, the can might appear as the actual product being advertised and the character might appear to take a drink and appear to enjoy it. Alternatively, the can might appear as a competitive product and the character might appear to take a drink and appear to dislike it. Should the user not pay attention, the character may become more agitated, loud, and/or demanding.

Another advertisement package for a car, for example, might show the car driving by, if the user is outside the car may appear to drive by. If inside, the user's environment may appear as a garage, where the car is parked, allowing the user a closer inspection.

Some embodiments may employ other features to engage the user(s), such as riddles or other mini-games that garner user engagement. Continued engagement and/or interaction may unlock additional features from the advertisement package.

In some embodiments, all of these features, and how they are presented, are dependent on the user's equipment, and the capabilities thereof.

The success of these advertisement packages can be tracked, with that information leading to more effective advertising. For example, which features garnered more attention and/or engagement may be determined, such that similar features can be included in future advertisement packages.

Other Star Wars examples may include C3PO in the user's living room asking for help. This interaction may include a riddle, such as C3PO saying "they took the prisoners to the same place as" in one of the movies and asking "where was that again?"

Luke may appear in the room fighting a battle, when he loses his light saber, which falls on the user's coffee table. If the user tosses it to him, he wins the fight.

Stormtroopers could be presented invading the user's living room. The user may see a blaster appear in front of them. The user can shoot at the troopers. These are examples of possible advertisements features contained in one or more advertisement packages for a movie. In each case, the user and their context are considered in deciding which features, and how to present the features to the user in an actual advertisement.

Advertisements for products could include overlaying a newer TV on the user's TV, thereby accounting for the user's equipment and environment. Advertisements for sports, sports teams, or sporting events might include a player, of whom the user is a fan, sitting on the user's couch asking trivia questions and/or discussing the sport or sporting event.

Advertisements of television shows and/or movies may include a scene projected into the user's home. Extras may be used to fill space and/or only primary characters may be displayed in a smaller spaces. Explicit visuals and/or costumes may be removed if minors are present. Objects in the home, such as a TV remote, may appear to be different objects, such as a light saber, blaster, or pistol. If the user is mobile, a character may appear walking next to them talking with them.

Through interaction/engagement, users may gain access to exclusive content, such as trailers; promotions, such as posters, discounts, early-access to tickets; and/or unlockable digital assets, such as an AR poster or achievement badge.

Some embodiments dynamically build each user's experience based on the user's environment and context. Some embodiments present pre-determined interactions executed for each user's environment and context. These interactions may be completely scripted and automated, loosely scripted and performed by actors remote from the user, or any combination thereof.

Figure 1B:
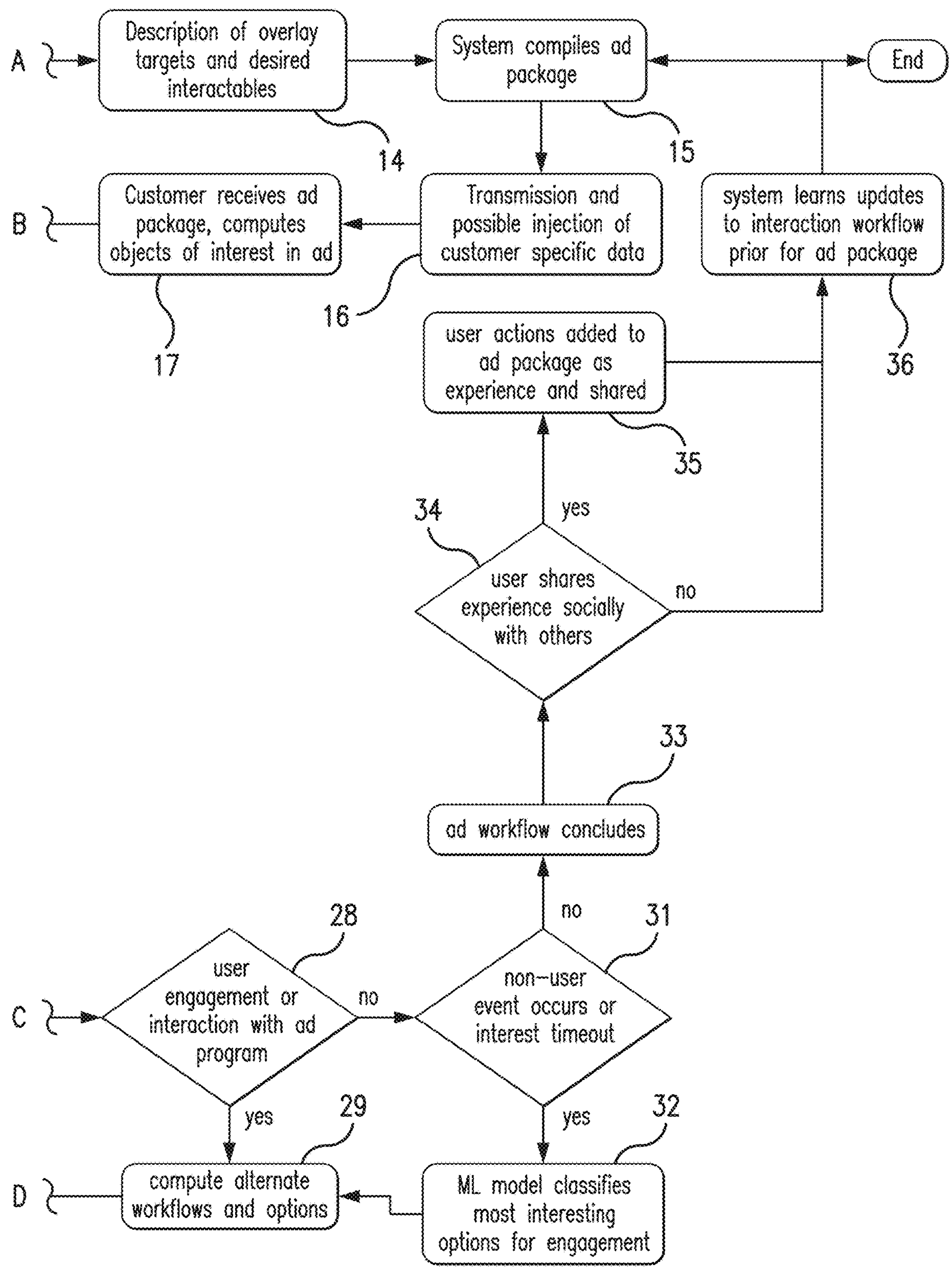

Referring now to FIG. 1A and FIG. 1B, an illustrative embodiment of a method is shown in accordance with various aspects described herein. As shown in 11, an advertiser creates, or has created, an advertisement package for something they wish to advertise, such as a product, service, company, etc. The advertisement package may include a plurality of features that may or may not be utilized in any specific ad. These features may include film clips for use in an XR environment and/or other XR features, such as virtual objects, sights, sounds, smells, etc.

As shown in 12, the advertisement package may include a description of space requirements for each of the optional features. As shown in 13, the advertisement package may include a description of additional optional props and/or objects. As shown in 14, the advertisement package may include a description of overlay targets and/or desirable interactions. For example, advertisement package for a television, may suggest overlaying views of that television over other screens (such as TVs, monitors, etc.) that may or may not appear in the user's environment. As shown in 15, these descriptions and optional features are compiled into the advertisement package.

As shown in 16, the advertisement package may be transmitted along with other programming content. In some embodiments, information about the user may also be transmitted. When the user's equipment receives the advertisement package, as shown in 17, the package is analyzed to determine object of interest. In some embodiments, the user's equipment stores information about the user, such as demographics and/or preferences, with may be considered during this initial analysis of the advertisement package.

As shown in 18, it is determined whether the user's environment is known. If not, as shown in 19, user's equipment may perform a scan of the user's environment, or otherwise garner information about the user's environment through sensors. This information gathering can also include gathering information about the user's equipment. For example, as shown in 20, it can be determined what real world devices, equipment, or other objects can interact with an XR environment. As shown in 21, as these devices are discovered, connection and/or control is established for use in the XR environment.

As shown in 22, the user's equipment and additional XR devices and/or objects are cataloged for use with features of the advertisement package to create a specific ad. As shown in 23, information about the user, their equipment, and their user environment is analyzed. For example, any available user demographic and or preference data may be considered. More specifically, should the user be a minor explicit content or optional features within the advertisement package may be deselected, skipped, or otherwise not used to create the specific instance of the ad. Similarly, if the user's environment is too small, certain content or optional features within the advertisement package may be deselected, skipped, or otherwise not used to create the specific instance of the ad. On the other hand, if the user is an adult and/or their environment is large enough, certain content or optional features within the advertisement package may be selected, chosen, or otherwise used to create the specific instance of the ad.

As shown in 24, the ad is projected into the XR environment surrounding the user. As shown in 25 objects matching optional features, such as props may be detected. If such objects are detected, such optional features may be overlaid on the objects, as shown in 26. For example, in an ad for a television, the advertised television may be overlaid on a real world television in the user's environment. Where possible, as shown in 27, XR devices are manipulated or controlled in accordance with the advertisement package.

During presentation of the ad, the user's engagement or interaction with the ad may be monitored, as shown in 28. In some embodiments, the user's engagement or interaction may unlock or otherwise trigger additional or special features from the advertisement package, as shown in 29 and 30. Should engagement or interaction wane, more dramatic and/or obtrusive features from the advertisement package may be incorporated into the ad, as shown in 31 and 32. In any case, the ad continues until it has run its course, as shown in 33.

In some embodiments, as shown in 34, the user may choose to share their experience with others, such as friends. As shown in 35, the user's interactions with the ad may be included in what gets shared with the user's friends. In any case, the user's experience with the ad, which was tailored to that user, their equipment, and environment may be shared with other users. This shared ad may be presented just as it was for the initial user, or may be adapted to the second user, their equipment, and/or environment. In some embodiments, an ad for a second user is recreated from the advertisement package specifically for the second user, without regard to the first user, such that the second user's experience with the ad is completely independent of the first user's experience with the ad.

Each user's experience, engagement, and interaction with the ad may be monitored. As shown in 36, advertisement packages may be improved or otherwise adapted through continual learning of which features were most effective in instigating user engagement or interaction with the ad. Similar features may be added to the advertisement packages and/or disparate features may be removed, according to such monitoring and/or learning.

Figure 2:
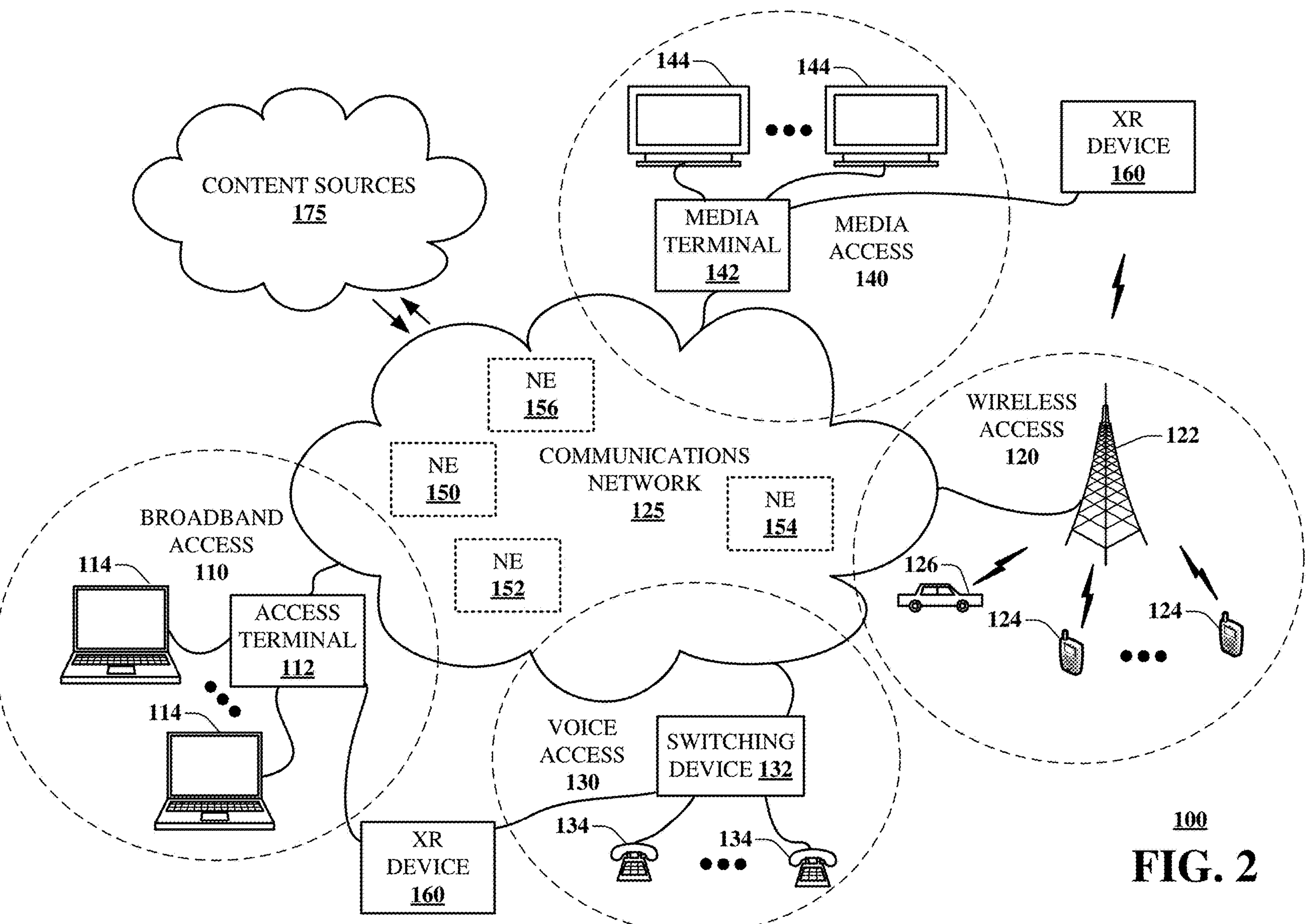
FIG. 2 is a block diagram illustrating an example, non-limiting embodiment of a communications network in accordance with various aspects described herein.

Referring now to FIG. 2, a block diagram is shown illustrating an example, non-limiting embodiment of a communications network 100 in accordance with various aspects described herein. For example, communications network 100 can facilitate in whole or in part presentation of XR advertisements and/or advertisement packages, as described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

As shown, the communications network 100 may include one or more XR devices 160. The XR devices 160 may connect to the communications network 100 through any of the broadband access 110, the access terminal 112, the wireless access 120, the base station or access point 122, the voice access 130, the switching device 132, the media access 140, the media terminal 142, or any combination thereof. This connection may be direct or indirect, such as via the data terminal(s) 114, the mobile device(s) 124, the vehicle(s) 126, the telephony device(s) 134, the audio/video display device(s) 144, or any combination thereof. The XR devices 160 may comprise any of VR goggles, projectors, sound generators, smell generators, haptic generators, etc. The XR devices 160 may also comprise any XR recognizable and/or controllable object. The XR devices 160 may also comprise processing systems to manage, control, or coordinate any of these devices.

Figure 3:
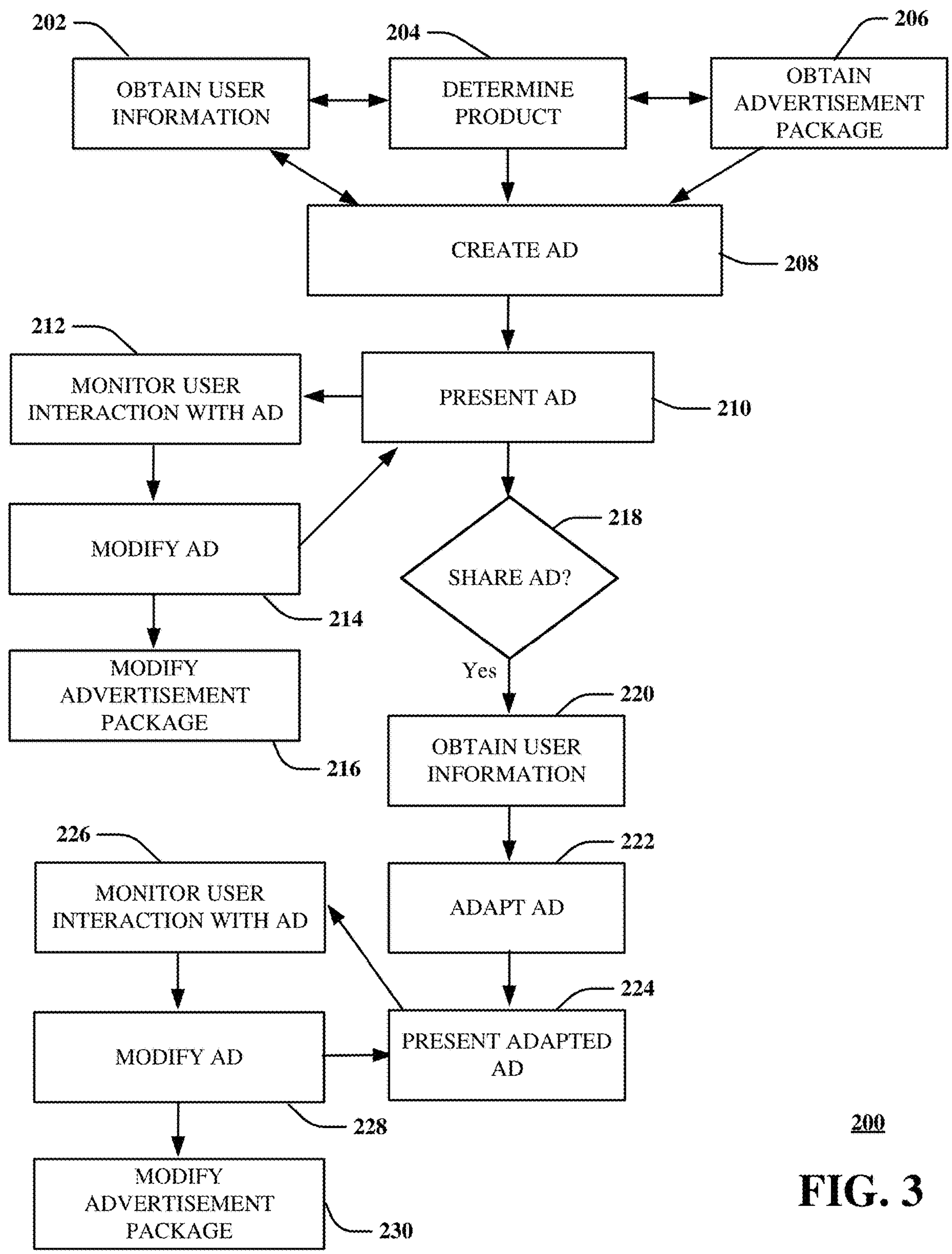
FIG. 3 depicts an illustrative embodiment of a method in accordance with various aspects described herein.

FIG. 3 depicts an illustrative embodiment of a method 200 in accordance with various aspects described herein. As shown in 202, a processing system, such as one or more of the network elements 150, 152, 154, 156 and/or the XR devices 160 receives, obtains, or reviews user information. This user information may include information about the user themselves, such as demographics and/or preferences. This user information may include information about the user's equipment, such as identification, configuration, location, capabilities, etc. This user information may include information about the user's environment, such as size, configuration, layout, location, etc.

As shown in 204, the processing system determines or chooses a product, company, or service for which to present advertisements to the user. This determination may be done independently of the user, such as merely following a prearranged order or schedule, or based on the user, such as by determining which product, company, or service would be of interest to the user based on the user information.

As shown in 206, the processing system receives, obtains, or reviews an advertisement package for the product, company, or service. The advertisement package may define an interactive XR advertisement for the product, company, or service. The advertisement package may include a plurality of optional features. For example, the advertisement package may include features for use in large environments, small environments, loud environments, quiet environments, crowded environments, vacant environments, indoor environments, outdoor environments, etc. The advertisement package may include features able to take advantage of different user equipment. For example, the advertisement package may include features specifically designed to incorporate VR goggles, projectors, sound generators, smell generators, and/or haptic generators, etc. Some of these features may depend on certain devices, such that if no smell generator is present, for example, that feature would not be invoked. Some embodiments may pick and choose features based at least in part on what equipment is available. The advertisement package may include features targeted for different types of users, such as based on demographics and/or preferences. For example, some features may be used for adults, where other features are used for children. Similarly, some features may be too dramatic and/or obtrusive for certain users, based on their preferences. In any case, advertisement package may include a plurality of optional features from which one or more features may be chosen, based on the user information.

It should be noted that steps 202, 204, and 206 may be performed at roughly the same time. In some embodiments, not all steps are actually performed. For example, the processing system may simply obtain user information and the advertisement package, without having made a determination as to the product, company, or service to advertise to the user. This may occur where a service provider uses a predetermined list or schedule for the advertisement packages. In some embodiments, steps 202, 204, and 206 are closely related and may even be dependent upon each other. In some embodiments, some of steps 202, 204, and 206 are performed sequentially.

Once the user information and the advertisement package are received, obtained, and/or reviewed, a specific targeted ad is created, based at least in part on the user information, as shown in 208. This creation may include choosing one or more features from the optional features to include in the targeted ad, according to the user information. This creation may also include customizing one or more of the selected features. For example, a feature may specify that a percentage of faces around the user be overlain with that of an actor or character. Customization may include choosing which faces to overlay, based on the user's environment. As another example, a feature may specify that faces around the user be overlain with that of an actor or character of which the user is a fan. Customization may include choosing which actor or character to overlay, based on the user's demographics, preferences, or other information known about the user, such as behavior or viewing habits.

Features may be selected or chosen and/or customized based on any portion, or combination of portions, of the user information. For example, features may be chosen based on the user's equipment and customized based on the user's environment. Features may be chosen based on the user's equipment and customized based on information known about the user themselves. Features may be chosen based on the user's environment and customized based on information known about the user themselves. Features may be chosen based on the user's environment and customized based on the user's environment. Features may be chosen based on information known about the user themselves and customized based on the user's environment and/or equipment. Because user information is expected to be different for different users, different targets ads may be created for different users, using the same advertisement package.

As shown in 210, the targeted ad is presented to the user(s) through their equipment. This may entail presentation using VR goggles, projectors, sound generators, smell generators, and/or haptic generators, etc. This may entail recognizing and/or controlling any XR recognizable and/or controllable objects. This presentation may be isolated to a single user, such that they are the only one experiencing the presentation. In some embodiments, the presentation is to multiple users, such that multiple users experience the presentation.

During presentation, as shown in 212, the user's interaction or engagement with the ad may be monitored. Should the user's interaction or engagement be less than desired, the ad may be modified to increase the user's interaction or engagement, as shown in 214. For example, additional features may be selected and incorporated into the targeted ad. In some embodiments, features already incorporated into the targeted ad are further modified. For example, more dramatic and/or obtrusive features from the advertisement package may be incorporated into the ad and/or features already incorporated into the targeted ad may be made more dramatic and/or obtrusive. In some embodiments, the user's interaction or engagement with the ad may unlock or otherwise trigger additional or special features from the advertisement package. Monitoring the user's interaction or engagement with the ad may also be used to modify the advertisement package, as shown in 216. For example, features the regularly cause the user's engagement or interaction wane may be deleted from the advertisement package.

In some embodiments, a user may share his or her experience with other users, such as friends. Thus, as shown in 218, it may be determined at any time, during or after presentation of the ad, whether the user has requested to share the ad with a friend or other user. If not, of course, nothing need happen. If so, as shown in 220, user information related to the subsequent user may be received, obtained, and/or reviewed. Such information may come from a variety of sources. For example, an initiating user (the one who requested to share the ad) may provide information that identifies the subsequent user. Thereafter, the processing system may review its own files about the user and/or request additional user information, such as from the subsequent user's equipment.

As shown in 222, the ad which was targeted to the initiating user may be adapted for the subsequent user. For example, the subsequent user may have slightly different equipment, environment, demographics, and/or preferences than the initiating user. Rather than completely starting from scratch, the ad targeted to the initiating user may be adapted for presentation to the subsequent user based on the user information related to the subsequent user. In this manner, the initiating user and the subsequent user may have similar, or identical experiences with the ad.

Of course, during presentation of the adapted ad, as shown in 224, the subsequent user's interaction or engagement with the ad may be monitored, as shown in 226. Should the subsequent user's interaction or engagement be less than desired, the adapted ad may be modified to increase the user's interaction or engagement, as shown in 228. For example, additional features may be selected and/or features already incorporated into the adapted ad are further modified. In some embodiments, the subsequent user's interaction or engagement with the ad may unlock or otherwise trigger additional or special features from the advertisement package. Monitoring the subsequent user's interaction or engagement with the adapted ad may also be used to modify the advertisement package, as shown in 230.

As discussed above, different targets ads may be created for different users, using the same advertisement package. Thus, any portion of the method 200 may be performed for different users, and may result in different targeted ads for different users.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
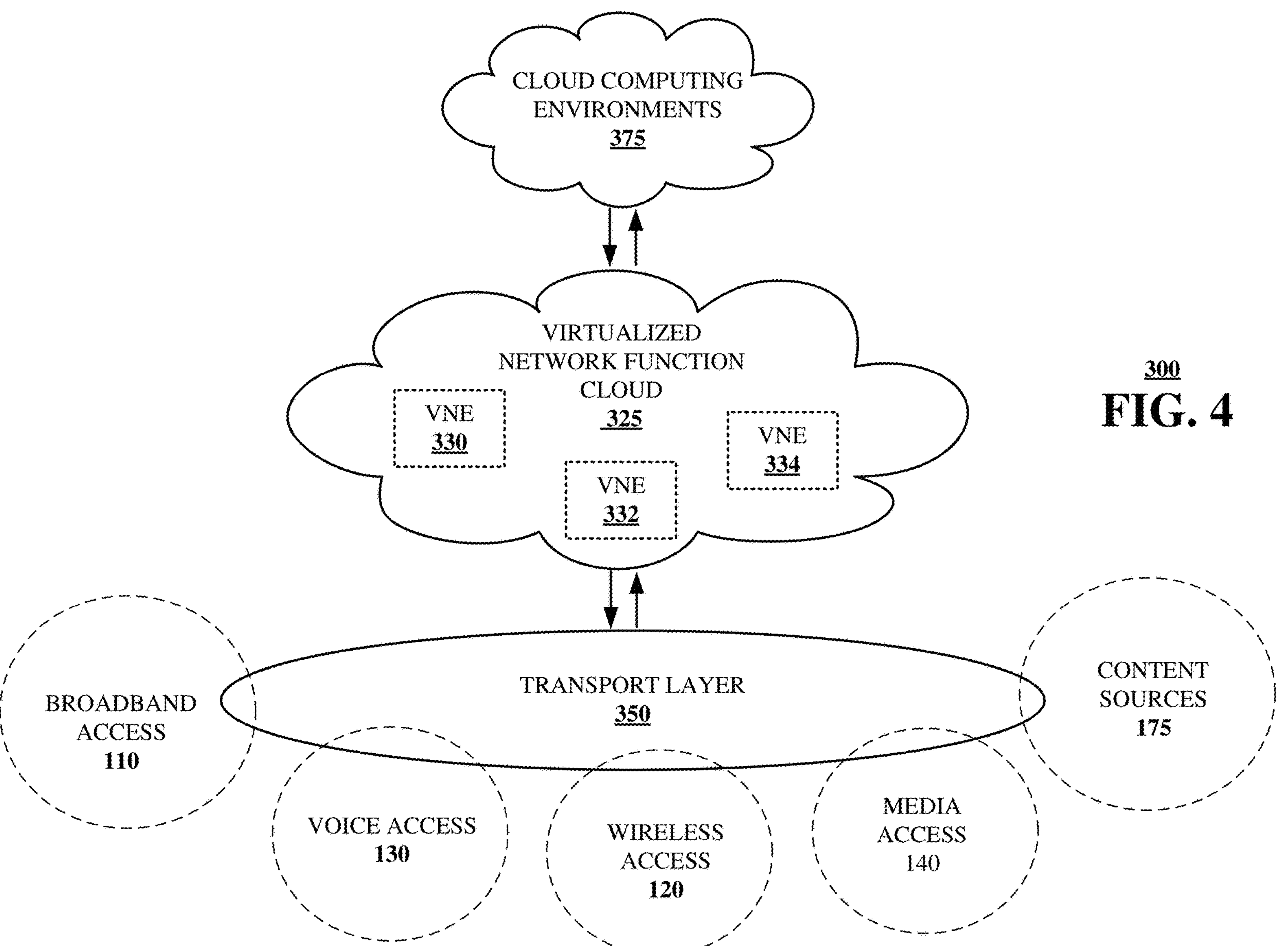
FIG. 4 is a block diagram illustrating an example, non-limiting embodiment of a virtualized communication network in accordance with various aspects described herein.

Referring now to FIG. 4, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system and method 200 presented in FIGS. 1, 2, and 3. For example, virtualized communication network 300 can facilitate in whole or in part presentation of XR advertisements and/or advertisement packages.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 2), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 5:
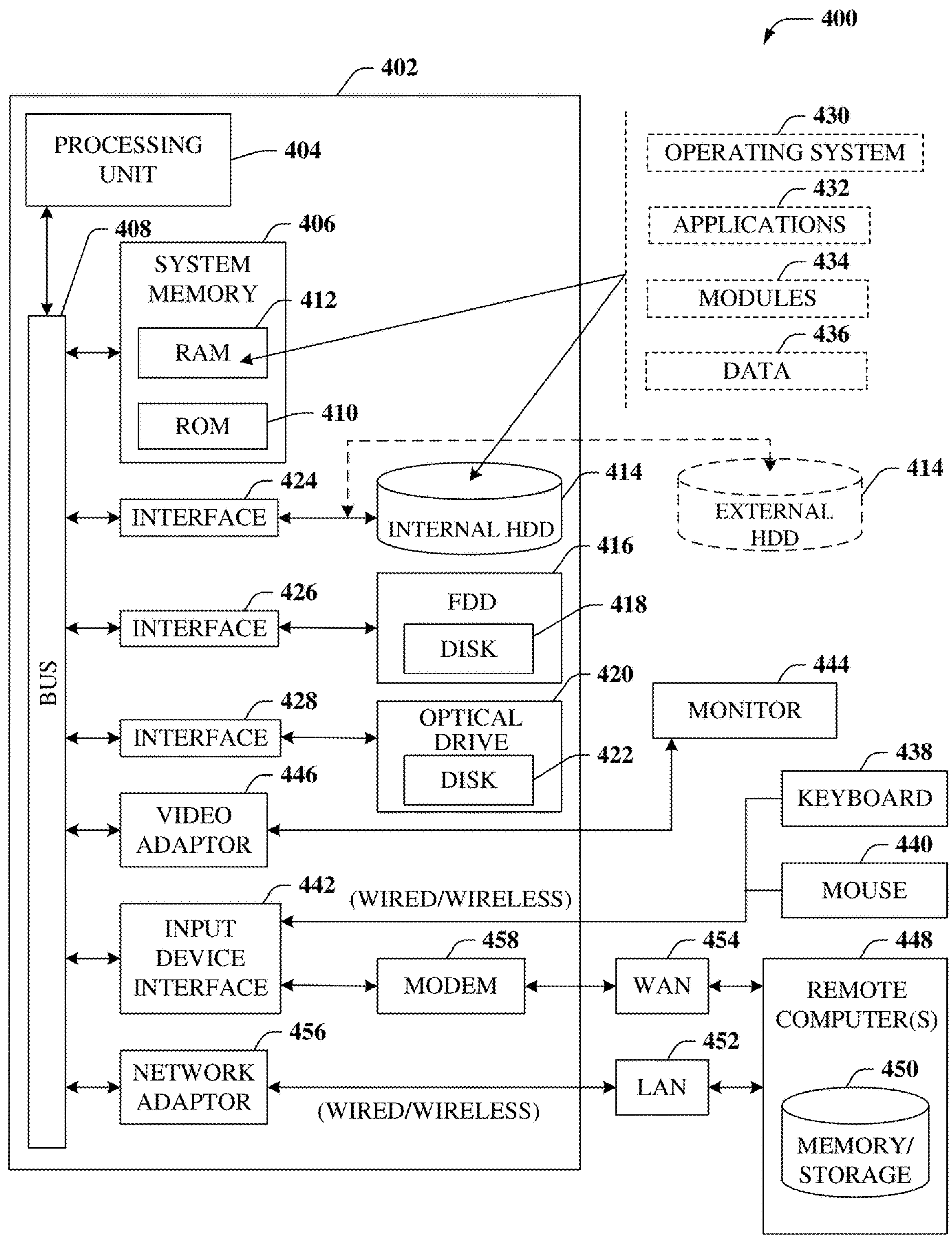
FIG. 5 is a block diagram of an example, non-limiting embodiment of a computing environment in accordance with various aspects described herein.

Turning now to FIG. 5, there is illustrated a block diagram of a computing environment in accordance with various aspects described herein. In order to provide additional context for various embodiments of the embodiments described herein, FIG. 5 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part presentation of XR advertisements and/or advertisement packages.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 6:
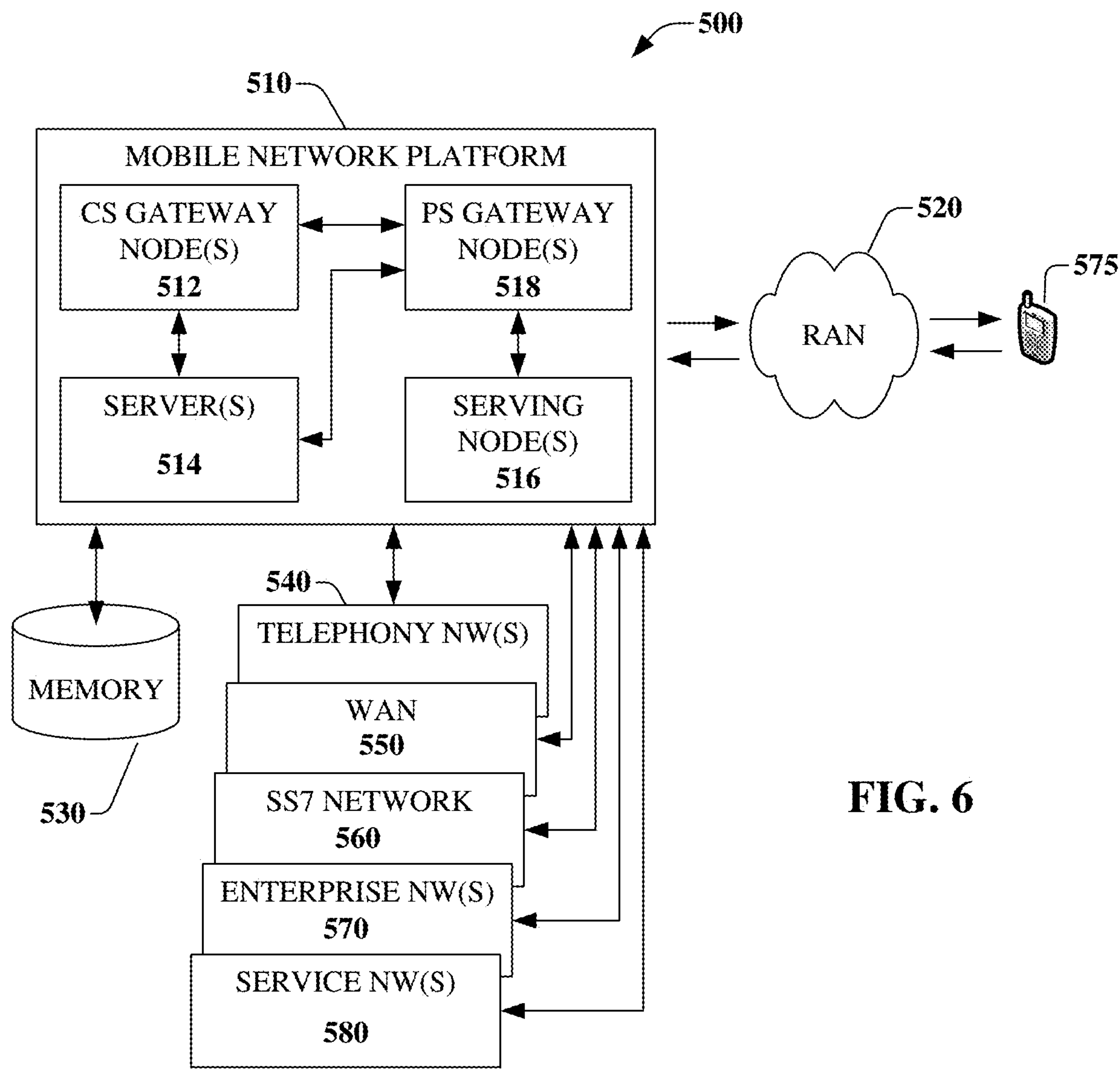
FIG. 6 is a block diagram of an example, non-limiting embodiment of a mobile network platform in accordance with various aspects described herein.

Turning now to FIG. 6, an embodiment 500 of a mobile network platform 510 is shown that is an example of network elements 150, 152, 154, 156, and/or VNEs 330, 332, 334, etc. For example, platform 510 can facilitate in whole or in part presentation of XR advertisements and/or advertisement packages. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 2 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 6, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 7:
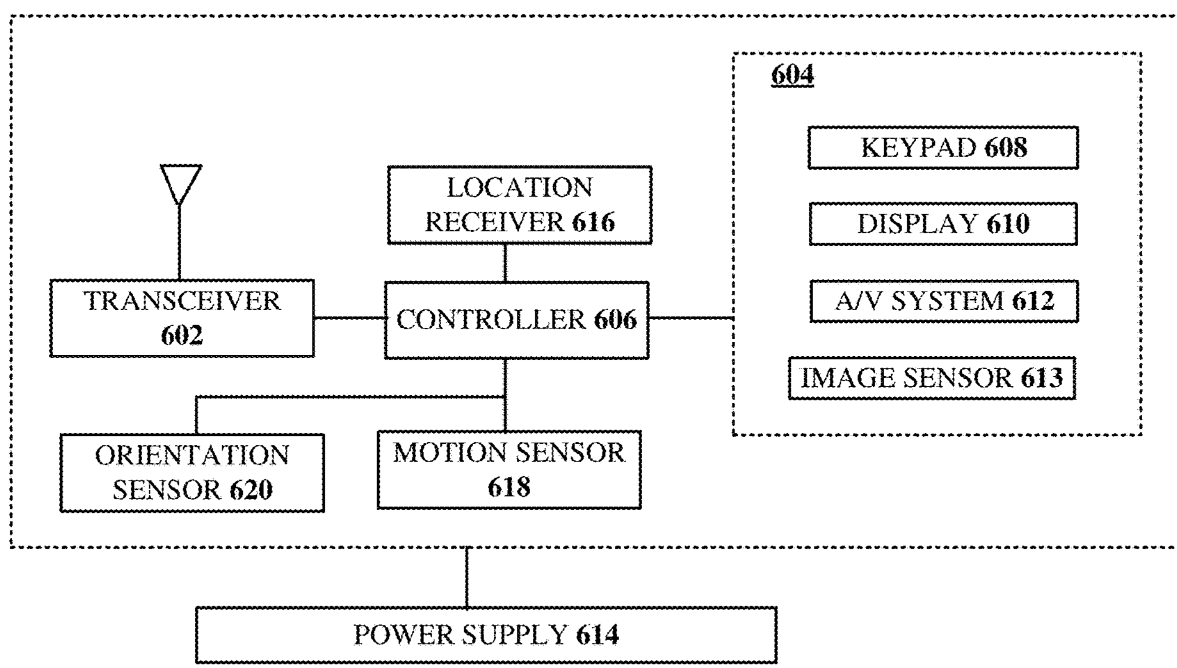
FIG. 7 is a block diagram of an example, non-limiting embodiment of a communication device in accordance with various aspects described herein.

Turning now to FIG. 7, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part presentation of XR advertisements and/or advertisement packages.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 7 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:

a processing system including a processor; and a memory that stores executable instructions that, when executed by the processing system, facilitate performance of operations, the operations comprising:

obtaining an advertisement package, wherein the advertisement package defines an interactive extended reality (XR) advertisement for presentation in an extended reality environment of a first user, wherein the advertisement package includes a plurality of optional features for inclusion in the advertisement;

obtaining first user information regarding a first user environment and first user equipment;

selecting one or more of the plurality of optional features based at least in part on the first user information, resulting in selected optional features;

generating the advertisement including the selected optional features, the advertisement comprising an interactive XR advertisement;

presenting the advertisement at the first user equipment;

receiving a request from the first user equipment to share the advertisement with a second user;

obtaining second user information regarding a second user environment and second user equipment;

adapting the advertisement in accordance with the second user information, resulting in an adapted advertisement;

presenting the adapted advertisement at the second user equipment;

monitoring a first engagement of the first user with the advertisement and a second engagement of the second user with the adapted advertisement; and modifying one or both of the advertisement and the adapted advertisement in accordance with the monitoring to include one or more additional optional features.

2. The device of claim 1, wherein the modifying is performed responsive to one or both of the first engagement and the second engagement being less than a desired engagement.

3. The device of claim 1, wherein the modifying further comprises modifying one or more of the selected optional features.

4. The device of claim 1, wherein the generating further comprises customizing one or more of the selected optional features according to the first user information.

5. The device of claim 4, wherein the one or more of the selected optional features is selected according to the first user equipment and customized according to the first user environment.

6. The device of claim 4, wherein the one or more of the selected optional features is selected according to the first user environment and customized according to the first user environment.

7. The device of claim 1, wherein the operations further comprise modifying the advertisement package responsive to a decrease in one or both of the first engagement and the second engagement.

8. The device of claim 7, wherein the modifying the advertisement package comprises deleting a feature of the plurality of optional features from the advertisement package.

9. The device of claim 1, wherein the operations further comprise determining a product or service to be advertised.

10. The device of claim 1, wherein the selected optional features are selected from a predetermined list.

11. A method comprising:

obtaining, by a processing system including a processor, an advertisement package that defines an interactive extended reality (XR) advertisement for presentation in an extended reality environment of a first user, wherein the advertisement package includes a plurality of optional features for inclusion in the advertisement;

obtaining, by the processing system, first user information regarding a first user environment and first user equipment;

selecting, by the processing system, one or more of the plurality of optional features based at least in part on the first user information, resulting in selected optional features;

generating, by the processing system, the advertisement including the selected optional features, the advertisement comprising an interactive XR advertisement;

presenting, by the processing system, the advertisement at the first user equipment;

receiving, by the processing system, a request from the first user equipment to share the advertisement with a second user;

obtaining, by the processing system, second user information regarding a second user environment and second user equipment;

adapting, by the processing system, the advertisement in accordance with the second user information, resulting in an adapted advertisement;

presenting, by the processing system, the adapted advertisement at the second user equipment;

monitoring, by the processing system during the presenting the advertisement, a first engagement of the first user with the advertisement;

monitoring, by the processing system during the presenting the adapted advertisement, a second engagement of the second user with the adapted advertisement; and modifying, by the processing system in accordance with the monitoring the first engagement and the monitoring the second engagement, one or both of the advertisement and the adapted advertisement in accordance with the monitoring to include one or more additional optional features.

12. The method of claim 11, wherein the modifying is performed responsive to one or both of the first engagement and the second engagement being less than a desired engagement.

13. The method of claim 11, wherein the modifying further comprises modifying one or more of the selected optional features.

14. The method of claim 11, further comprising modifying, by the processing system, the advertisement package responsive to a decrease in one or both of the first engagement and the second engagement.

15. The method of claim 11, further comprising determining, by the processing system, a product or service to be advertised.

16. The method of claim 11, wherein the selected optional features are selected from a predetermined list.

17. A non-transitory machine-readable medium comprising executable instructions that, when executed by a processing system including a processor, facilitate performance of operations comprising:

obtaining an advertisement package for a product, wherein the advertisement package defines an interactive extended reality (XR) advertisement for presentation in an extended reality environment of a first user, wherein the advertisement package includes a plurality of optional features for inclusion in the advertisement;

obtaining first user information regarding a first user environment and first user equipment;

selecting one or more of the plurality of optional features based at least in part on the first user information, resulting in selected optional features;

generating the advertisement including the selected optional features, the advertisement comprising an interactive XR advertisement;

presenting the advertisement at the first user equipment;

receiving a request from the first user equipment to share the advertisement with a second user;

obtaining second user information regarding a second user environment and second user equipment;

adapting the advertisement in accordance with the second user information, resulting in an adapted advertisement;

presenting the adapted advertisement at the second user equipment;

monitoring a first engagement of the first user with the advertisement and a second engagement of the second user with the adapted advertisement; and modifying one or both of the advertisement and the adapted advertisement in accordance with the monitoring to include one or more additional optional features.

18. The non-transitory machine-readable medium of claim 17, wherein the modifying is performed responsive to one or both of the first engagement and the second engagement being less than a desired engagement.

19. The non-transitory machine-readable medium of claim 17, wherein the modifying further comprises modifying one or more of the selected optional features.

20. The non-transitory machine-readable medium of claim 17, wherein the operations further comprise modifying the advertisement package responsive to a decrease in one or both of the first engagement and the second engagement.

* * * * *